Patented Oct. 19, 1937

2,096,353

UNITED STATES PATENT OFFICE 2,096,353

METHOD OF OBTAINING FURFURAL

Carl Gunnar Carlsson Skogh, Vastervik, Sweden

No Drawing. Application January 25, 1934, Serial No. 708,257. In Sweden January 26, 1933

4 Claims. (Cl. 260—54)

It is a known fact that furfural is obtained from materials containing pentosanes and pentoses by heating the said materials together with water while adding an acid or an acid salt as a catalyzer. The follicles of certain kinds of corn, corn cobs, the wood of folliferous trees et cetera, are rich in pentosanes. At charring of wood in charcoal piles or kilns furfural is obtained, but the yield is very small.

The present invention relates to a method of producing furfural without directly adding an acid or an acid salt in the process, the yield of said method considerably exceeding the one obtained in the methods used hitherto.

For a longer or a shorter time, varying for different materials, the material giving off furfural is, according to the invention, treated with water at atmospheric pressure or at a pressure, which exceeds or lies below the atmospheric pressure, and at an elevated temperature of at least 50° C. and below that at which the pentosanes are dissolved. Hereafter as much water as possible is removed from the material in a suitable way, and then the material is treated with superheated steam in an autoclave at pressures exceeding the atmospheric pressure and at temperatures above 100° C., whereby the acid necessary for hydrolyzing the pentosanes and for dehydrating the pentoses is formed from the raw material proper. The formed furfural and other by-products, which are recovered in a known way, are drawn off together with the steam during the course of the reaction or after the same has been accomplished.

The process of the present invention is set forth more in detail in the following example.

Chopped oak wood (oak chips) is treated, e. g. in a separate vessel or in extraction batteries, for 22 hours with water at a temperature of 95–100° C. and after that the water is removed. The remaining oak wood or oak mash is placed in an autoclave of a suitable material, for example, of copper or iron, lined with acid proof material, and is subjected to a treatment of superheated steam. The steam is introduced at one or more places into the lower part of the autoclave and is allowed to pass through a screen bottom into the mass in the autoclave. The air is allowed to escape through a valve provided at the top of the autoclave, the said valve being closed after all air has been expelled. The steam is introduced into the autoclave until a pressure of 6–6,5 kg./cm.$^2$ and a temperature of 160°–165° C. has been obtained. At this pressure and at this temperature the acid required for hydrolyzing the pentosanes and dehydrating the pentoses to furfural is formed from the raw material. The formation of furfural in rather large quantities does not begin until after 30–60 minutes. This time varies considerably for different raw materials. The autoclave is kept at the above mentioned pressure and temperature for a total time of 4–5 hours, after which time the formation of furfural generally has ceased. The valve at the top of the autoclave is opened and the steam, which is now mixed with vapors of furfural, is allowed to escape.

For condensation purposes the vapors may either be conducted through a condenser and the condensate be led into a column apparatus, in which the furfural is drawn off, or the vapors may also be led directly into the column apparatus. To expel all of the furfural containing vapors from the autoclave steam is blown from below through the mass in the latter and the vapors are led away through the said valve, as mentioned above. Instead of retaining the vapors in the autoclave for 4–5 hours, as described above, it is also possible to let them escape periodically or continuously during the steam treatment, if only care is taken that the quantities of vapor leaving per unit of time are not so large, that the condensate becomes too diluted.

In order to shorten the water treatment one may first treat the pentose and pentosan-containing material with water having a temperature of 50° to 100° C. for at least five hours and then at a temperature above 100° C. and at a maximum pressure of 3.0 kg./cm.$^2$ for at least 30 minutes.

By treating material giving off furfural first with water according to the present method a yield of furfural of up to 10% of the original dry weight of oak wood is obtained. If oak chips are heated without preceding treatment by water, as is described above, a yield of only 3–4% is obtained. Oak wood contains about 25% of pentoses and according to the formula $C_5H_{10}O_5 \rightarrow C_5H_4O_2 + 3H_2O$ one could obtain theoretically 16% of furfural. By means of the present procedure a yield of more than 60% of that which is theoretically possible is thus obtained, or twice as much as is the case in the methods known hitherto. By working with a pressure above the atmospheric pressure when treating the raw material with water, with a maximum pressure of 3.0 kg./cm.$^2$, the duration of treatment may be considerably shortened, but then there is always the risk of the pentoses being dissolved and escaping with the water, when the same is removed, whereby losses arise.

Similar circumstances are to be found in other materials containing pentosanes, such as bran of oats. If this material is treated in the same way, as is described above, first with water and is then subjected to the same pressure and temperature, a yield of furfural of about 14% is obtained; without preceding treatment by means of water only about 6-7% are obtained.

The method may also be carried out at a lower or higher pressure and temperature respectively, but in the former case the procedure is too lengthy, in the latter case the yield of furfural will be less. Different raw materials require different pressures and temperatures, respectively, for obtaining the best result. Often it may be desirable with certain raw materials to use a higher temperature and pressure to begin with so as to accelerate the formation of acid.

In addition to furfural also methyl alcohol, acetone, acetone oils and acids, e. g. acetic acid, are obtained.

Having now described my invention, what I claim as new and desire to secure by Letters Patent is:

1. A method for obtaining furfural from pentosan-containing material which comprises treating the initial material with water at a temperature of at least 50° C. and below that at which the pentosans are dissolved, separating the water from the material, then treating the material with superheated steam under superatmospheric pressure and recovering the vaporous products, including furfural, from the steam.

2. The process according to claim 1 in which the treatment with water is carried out in stages in the first of which the initial material is treated with water at a temperature between 50° and 100° C. and in the second of which the treatment with water at a temperature above 100° C. and under a pressure not in excess of 3 kg./cm.$^2$.

3. A process for obtaining furfural from pentosan-containing material which comprises soaking the initial material in hot water for an extended period, the temperature of the water being at least 50° C. and below that at which the pentosans are dissolved, removing the water from the material to the greatest possible extent, placing the material in an autoclave, passing in superheated steam until a pressure of about 6 kg./cm.$^2$ is built up and maintaining this pressure until the furfural is all removed from the material.

4. A method for obtaining furfural from oak chips which comprises treating the chips with water at 95°–100° C. for about 22 hours, removing the water, placing the residual chips in an autoclave, passing in steam until a pressure of 6–6.5 kg./cm.$^2$ and a temperature of 160°–165° C. are obtained, maintaining these conditions for 4–5 hours and recovering furfural from the steam.

CARL GUNNAR CARLSSON SKOGH.